US008301375B2

(12) United States Patent
Chiayee et al.

(10) Patent No.: US 8,301,375 B2
(45) Date of Patent: Oct. 30, 2012

(54) INTERFACE FOR A GPS SYSTEM

(75) Inventors: Steve Chang Chiayee, San Jose, CA (US); Ashutosh Pande, San Jose, CA (US); Lionel Jacques Garin, Palo Alto, CA (US); Gengsheng Zhang, Cupertino, CA (US)

(73) Assignee: CSR Technology Inc., San Jose, CA (US)

( * ) Notice: Subject to any disclaimer, the term of this patent is extended or adjusted under 35 U.S.C. 154(b) by 1713 days.

(21) Appl. No.: 10/523,669

(22) PCT Filed: Aug. 15, 2003

(86) PCT No.: PCT/US03/25821
§ 371 (c)(1),
(2), (4) Date: Aug. 1, 2005

(87) PCT Pub. No.: WO2004/017092
PCT Pub. Date: Feb. 26, 2004

(65) Prior Publication Data
US 2006/0036365 A1   Feb. 16, 2006

Related U.S. Application Data

(60) Provisional application No. 60/403,836, filed on Aug. 15, 2002.

(51) Int. Cl.
*G01C 21/28* (2006.01)
*G01S 1/00* (2006.01)

(52) U.S. Cl. .................. 701/468; 342/357.22; 455/3.02; 455/20

(58) Field of Classification Search ............... 701/468; 342/357.22; 455/3.02, 20
See application file for complete search history.

(56) References Cited

U.S. PATENT DOCUMENTS

| | | | | | |
|---|---|---|---|---|---|
| 6,133,871 | A | * | 10/2000 | Krasner | 342/357.74 |
| 6,133,873 | A | * | 10/2000 | Krasner | 342/357.63 |
| 6,133,874 | A | * | 10/2000 | Krasner | 342/357.63 |
| 6,134,483 | A | * | 10/2000 | Vayanos et al. | 701/13 |
| 6,150,980 | A | * | 11/2000 | Krasner | 342/357.29 |
| 6,188,351 | B1 | * | 2/2001 | Bloebaum | 342/357.42 |
| 6,204,808 | B1 | * | 3/2001 | Bloebaum et al. | 342/357.42 |
| 6,421,002 | B2 | * | 7/2002 | Krasner | 342/357.64 |
| 6,529,160 | B2 | * | 3/2003 | Jandrell | 342/357.12 |
| 6,542,823 | B2 | * | 4/2003 | Garin et al. | 701/213 |
| 6,671,620 | B1 | * | 12/2003 | Garin et al. | 701/470 |
| 2002/0111171 | A1 | * | 8/2002 | Boesch et al. | 455/456 |
| 2002/0154056 | A1 | * | 10/2002 | Gaal et al. | 342/357.06 |
| 2002/0186165 | A1 | * | 12/2002 | Eschenbach | 342/357.15 |
| 2003/0040331 | A1 | * | 2/2003 | Zhao | 455/552 |

* cited by examiner

Primary Examiner — Tuan C. To
(74) Attorney, Agent, or Firm — RatnerPrestia

(57) ABSTRACT

A protocol independent interface for processing, within a mobile device, protocol aiding data received at a call processor with a Global Positioning System ("GPS") interface, where the protocol aiding data is produced according to a Geolocation Server Station protocol is disclosed. The protocol independent interface may include a means for receiving, at the GPS interface, the protocol aiding data received at the call processor, means for converting the received protocol aiding data to interface data that is transparent to the Geolocation Server Station protocol, and means for passing the interface data to a GPS module.

18 Claims, 9 Drawing Sheets

INTERFACE FOR A GPS SYSTEM

CROSS REFERENCE TO RELATED APPLICATIONS

This application claims the benefit of provisional patent application Ser. No. 60/403,836, filed on Aug. 15, 2002, and titled "INTERFACE FOR SATPS SYSTEMS," which is herein incorporated by reference.

BACKGROUND OF THE INVENTION

1. Field of the Invention

This invention relates generally to the field of wireless communications. In particular, the invention relates to a method and apparatus for interfacing the Global Positioning System ("GPS") devices to different communication devices independent of any aiding specific protocols emanating from the communication devices.

2. Related Art

The worldwide utilization of wireless devices (also known as "mobile devices") such as two-way radios, portable televisions, Personal Digital Assistants ("PDAs"), cellular telephones (also known as "wireless telephones," "wireless phones," "mobile telephones," "mobile phones," and/or "mobile stations"), satellite radio receivers and Satellite Positioning Systems ("SATPS") such as the Global Positioning System ("GPS"), also known as NAVSTAR, is growing at a rapid pace. As the number of people employing wireless devices increases, the number of features offered by wireless service providers also increases, as does the integration of these wireless devices with other products.

Since the creation of the NAVSTAR GPS system by the U.S. Department of Defense ("DoD") in the early 1970s, numerous civilian applications have arisen that utilize new technologies associated with GPS. These new technologies include, as examples, personal GPS receivers that allow users to determine their positions on the surface of the Earth, and numerous communication networks such as the Code Division Multiple Access (CDMA) and Time Division Multiple Access (TDMA) cellular networks that utilize GPS clock references to operate. As a result of these new technologies, there is a growing demand for mobile communication devices that can transmit, among other things, their locations in emergency situations, incorporate positional information with communication devices, locate and track tourists, children and the elderly, and provide security for valuable assets.

In general, GPS systems are typically satellite (also known as "space vehicle" or "SV") based navigation systems. Examples of GPS include but are not limited to the United States ("U.S.") Navy Navigation Satellite System ("NNSS") (also know as TRANSIT), LORAN, Shoran, Decca, TACAN, the Joint Program Office ("JPO") Global Positioning System known as NAVSTAR, which was developed by the Department of Defense (DoD), the Russian counterpart known as Global Navigation Satellite System ("GLONASS") and any future Western European GPS such as the proposed "Galileo" program. The NAVSTAR GPS (henceforth referred to simply as "GPS") was originally developed as a military system to fulfill the needs of the U.S. military; however, the U.S. Congress later directed the DoD to also promote GPS's civilian uses. As a result, GPS is now a dual-use system that may be accessed by both U.S. government agencies (such as the military) and civilians. The GPS system is described in *Global Positioning System: Theory and Practice*, fifth, revised ed., by Hofmann-Wellenhof, Lichtenegger and Collins; Springer-Verlag, Wien, N.Y., 2001, which is fully incorporated herein by reference.

Typically, the utilization of GPS includes identifying precise locations on the Earth and synchronizing telecommunication networks such as military communication networks and the cellular telephone networks such as CDMA and TDMA type systems. Additionally, with the advent of the United States Congress' mandate, through the Federal Communications Commission ("FCC"), for a cellular telephone network that is capable of providing a cellular telephone user's location within 50 feet in emergency situations (generally known as "Enhanced 911" service or "E911"), GPS is being employed for both location determination and synchronization in many cellular applications.

In general, the array of GPS satellites (generally known as a "GPS constellation") transmit highly accurate, time coded information that permits a GPS receiver to calculate its location in terms of latitude and longitude on Earth as well as the altitude above sea level. GPS is designed to provide a base navigation system with accuracy within approximately 100 meters for non-military users and even greater precision for the military and other authorized users (with Selective Availability "SA" set to ON).

In general, GPS comprises three major system segments: space, control, and user. The space segment of GPS is a constellation of satellites orbiting above the earth that contain transmitters, which send highly accurate timing information to GPS receivers on earth. At present, the implemented GPS constellation includes 21 main operational satellites plus three active spare satellites. These satellites are arranged in six orbits, each orbit containing three or four satellites. The orbital planes form a 55° angle with the equator. The satellites orbit at a height of approximately 10,898 nautical miles (20,200 kilometers) above the Earth with orbital periods for each satellite of approximately 12 hours.

Generally, each of the orbiting satellites contains four highly accurate atomic clocks (two rubidium and two cesium). These atomic clocks provide precision timing pulses used to generate a unique binary code (also known as a pseudorandom "PRN-code" or pseudo noise "PN-code") that is transmitted to Earth. The PRN-code identifies the specific satellite in the GPS constellation. The satellite also transmits a set of digitally coded information that includes two types of orbital parameters for determining the locations-in-space for the satellites known as almanac data and ephemeris data.

The ephemeris data (also known as "ephemerides") defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the position of the satellite above the Earth at any given time. Typically, current ephemeris data is sufficient for determining locations in space to a few meters or a few tenths of meters at current levels of SA. A ground control station updates the Ephemeris data each hour to ensure accuracy. However, after about two hours the accuracy of the ephemeris data begins to degrade.

The almanac data is a subset of the ephemeris data. The almanac data includes less accurate information regarding the location of all the satellites in the constellation. The almanac data includes relatively few parameters and is generally sufficient for determining locations-in-space to a few kilometers. Each GPS satellite broadcasts the almanac data for all the GPS satellites in the GPS constellation on a twelve and one-half ("12.5") minute cycle. Therefore, by tracking only one satellite, the almanac data of all the other satellites in orbit are obtained. The almanac data is updated every few days and is useful up to approximately several months. Because of its relatively long lifetime, GPS receivers that have been off for more than a few hours typically utilize the almanac data to determine which GPS satellites are in-view. However, both the almanac and ephemeris data are valid only for a limited amount of time. As such, the location of the satellites based on this information is less and less accurate as the almanac and ephemeris data ages unless the data is updated at appropriate intervals in time.

The ephemeris data includes three sets of data available to determine position and velocity vectors of the satellites in a terrestrial reference frame at any instant. These three sets of data include almanac data, broadcast ephemerides, and precise ephemerides. The data differs in accuracy and is either available in real-time or after the fact. Typically, the purpose of the almanac data is to provide the user with less precise data to facilitate receiver satellite search or for planning tasks such as the computation of visibility charts. The almanac data are updated at least every six days and are broadcast as part of the satellite message. The almanac message essentially contains parameters for the orbit and satellite clock correction terms for all satellites. The GPS almanac data is described in "GPS Interface Control Document ICD-GPS-200" for the "NAVSTAR GPS Space Segment and Navigation User Interfaces" published by NavTech Seminars & NavTech Book and Software Store, Arlington, Va., reprinted February, 1995, which is herein incorporated by reference.

In a typical operation example, when a GPS receiver is first turned on (generally known as a "cold start") or woken up from a long stand-by condition of more than a few hours, the GPS receiver will scan the GPS spectrum to acquire a GPS signal transmitted from an available GPS satellite. Once the GPS signal is acquired the GPS receiver will then download the GPS almanac data for the GPS constellation, the ephemeris data and clock correction information from the acquired GPS satellite. Once the almanac data is downloaded, the GPS satellite will then scan the GPS spectrum for the available (i.e., the "in-view") GPS satellites as indicated by the almanac data. Ideally, given sufficient time and assuming the environmental conditions surrounding the GPS receiver allow the GPS receiver to acquire two to three additional in-view GPS satellites, the GPS receiver receives both distance and timing information from the three to four satellites and calculates its position on the Earth.

Unfortunately, for many applications both time and environmental conditions may limit a GPS receiver's ability to download the GPS almanac data, especially in indoor or limited sky-view conditions. The problems associated with time are usually described by the Time-to-First-Fix ("TTFF") values. If the TTFF values are high, the GPS receiver will have limited applications because it will take too long to determine its initial location.

As an example, in a wireless or mobile (such as a cellular) telephone application, a mobile telephone or personal digital assistant ("PDA") with an integrated GPS receiver may have to wait approximately 12.5 minutes (assuming perfect environmental conditions with all necessary in-view satellites being visible) for the GPS receiver to download the GPS almanac before making a call. This would be unacceptable for most applications.

In cellular telephone applications, this limitation is even more unacceptable in view of the E911 mandate that requires that a cellular telephone send its position information to emergency personal in an E911 emergency call. If users find themselves in an emergency situation with a GPS enabled cellular telephone that is turned off or in a long stand-by condition, those users would have to generally first wait for approximately 12.5 minutes of time with continuous uninterrupted satellite visibility (because the GPS receiver typically needs a strong signal to acquire the almanac and/or ephemeris data reliably) before being able to make an emergency call that would transmit the user's location to the emergency personal. In typical metropolitan or naturally obstructed environments, this wait may be longer than 12.5 minutes because the environmental conditions may make acquiring the first satellite more difficult. It is appreciated that this would be unacceptable, especially in a life-threatening situation.

Past approaches to reduce the amount of time required to download the almanac data have included storing some sort of almanac (such as factory installed almanac data) in a memory unit (such as a read-only memory "ROM") in the GPS receiver. Typically, this pre-stored almanac data is utilized to reduce the TTFF in a cold-start condition. In this approach, the cold-start condition usually still has a relatively long TTFF time due to the uncertainties associated with the satellite positions and the age of the pre-stored almanac. Once the first fix is acquired, this GPS receiver may then download the updated almanac data from the acquired satellite and update the ROM (or a read-access memory "RAM") for future use. However, this approach still requires that the GPS receiver receive the updated almanac data (i.e., receiving a "fresh" copy of the almanac data) from the satellites for future acquisitions. Receiving the updated almanac data will still require significant amounts of time that will affect the performance of the GPS receiver.

In response to these problems, aiding approaches have been developed for mobile telephones that assist the GPS receiver by providing aiding data from a communication module (also known as a "call processor" or "CP") for such purposes as acquisition, location calculation and/or sensitivity improvement). Unfortunately, these aiding approaches in wireless networks are typically cellular network (i.e., cellular platforms such as TDMA, GSM, CDMA, etc.) and vendor specific, and are provided by Geolocation Server Stations located at the cellular network. As a result, the GPS receiver in the mobile telephone (also known as a "mobile station" or "MS") must typically be compatible with the Geolocation Server Station of the cellular network.

However, there are numerous cellular networks in operation throughout the United States and abroad that either incorporate, or will incorporate, Geolocation Server Stations that utilize Geolocation Server Station protocols that are not compatible with each other. Therefore, there is a need for a system capable of allowing a GPS receiver to operate with the numerous Geolocation Server Stations that is Geolocation Server Station protocol independent.

SUMMARY

A protocol independent interface for processing, within a mobile device, protocol aiding data received at a call processor with a Global Positioning System ("GPS") interface, where the protocol aiding data is produced according to a Geolocation Server Station protocol is disclosed. The protocol independent interface may include a means for receiving, at the GPS interface, the protocol aiding data received at the call processor, means for converting the received protocol aiding data to interface data that is transparent to the Geolocation Server Station protocol, and means for passing the interface data to a GPS module.

In operation, the protocol independent interface performs a process for processing, within a mobile device, protocol aiding data received at a call processor with a Global Positioning System ("GPS") interface, where the protocol aiding data is produced according to a Geolocation Server Station protocol. The protocol independent interface performs a process that receives, at the GPS interface, the protocol aiding data received at the call processor, converts the received protocol aiding data to interface data that is transparent to the Geolocation Server Station protocol, and passes the interface data to a GPS module.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
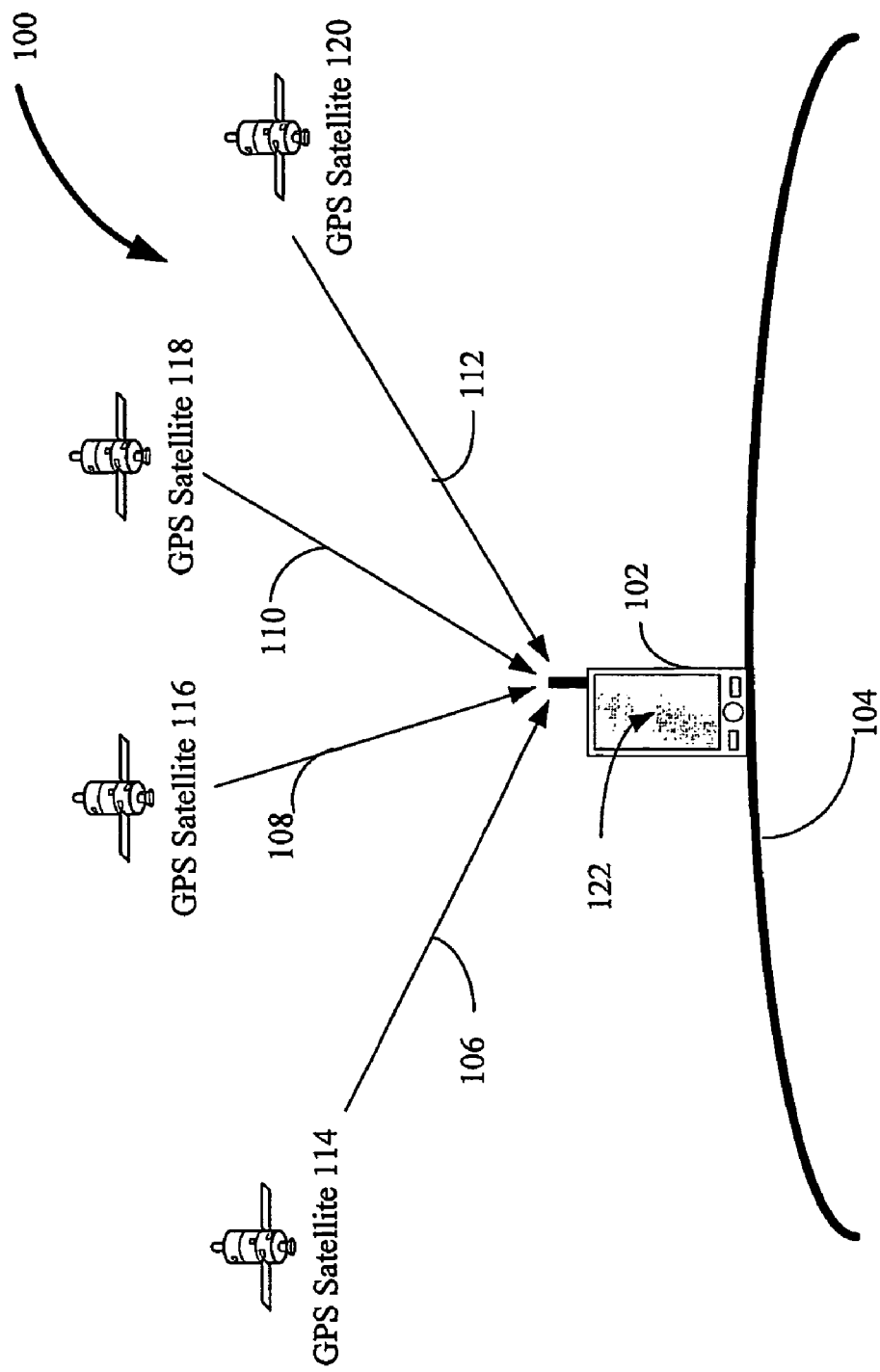
FIG. 1 is an illustration of a typical known GPS receiver in operation.

Turning first to FIG. 1: In FIG. 1, a diagram 100 of an example implementation of a known Global Positioning System ("GPS") is illustrated. In operation, a GPS receiver 102 located on the Earth 104 is designed to pick up signals 106, 108, 110 and 112 from several GPS satellites 114, 116, 118 and 120, respectively, simultaneously. The GPS receiver 102 decodes the information and, utilizing the time and ephemeris data, calculates the position of the GPS receiver 102 on the Earth 104. The GPS receiver 102 usually includes a floating-point processor (not shown) that performs the necessary calculations and may output a decimal or graphical display of latitude and longitude as well as altitude on a display 122. Generally, signals 106, 108 and 110 from at least three satellites 114, 116 and 118, respectively, are needed for latitude and longitude information. A fourth satellite signal 112 from satellite 120 is needed to compute an altitude.

Figure 2:
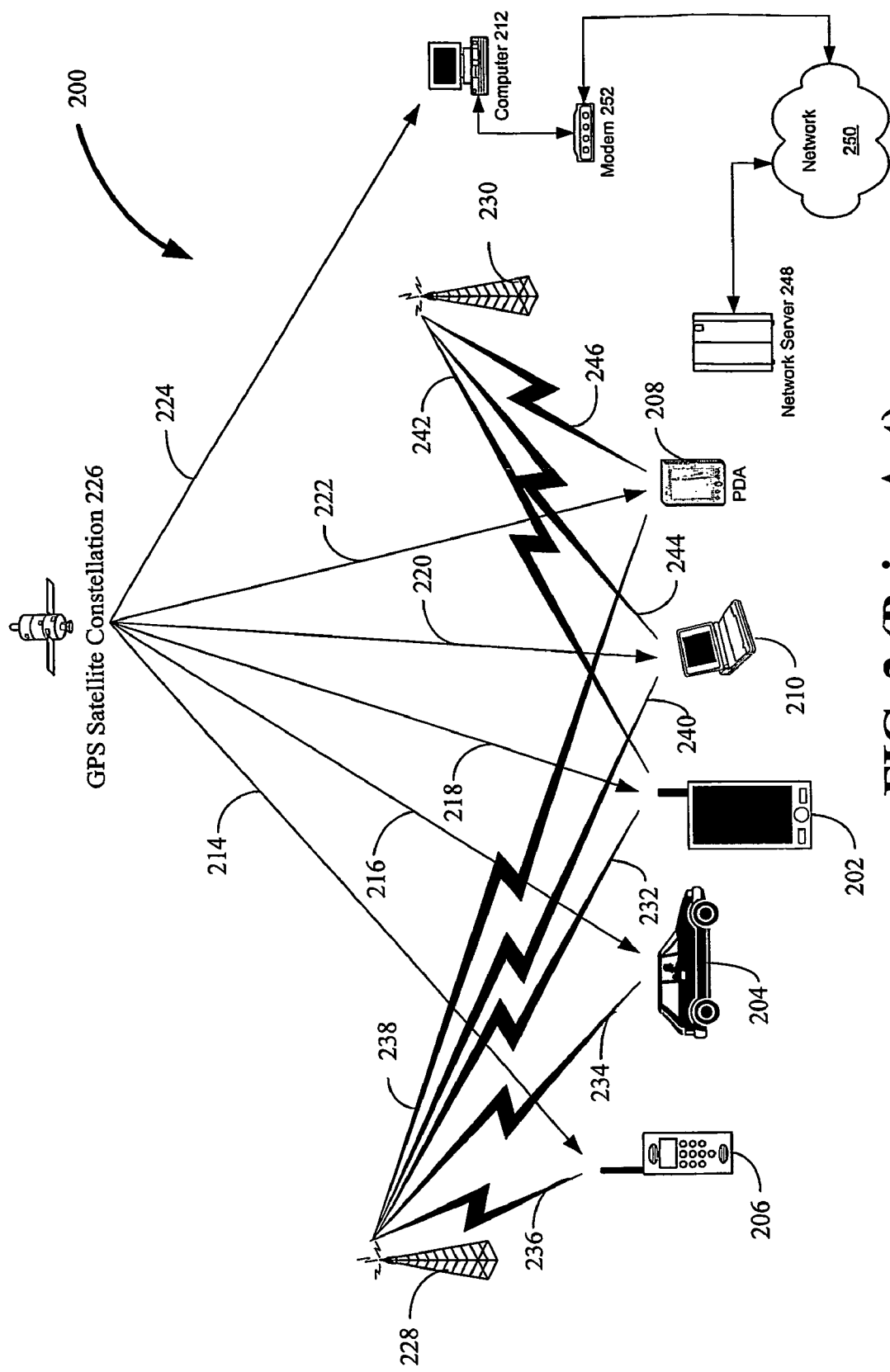
FIG. 2 illustrates a diagram 200 of a number of different known applications for GPS.

FIG. 2 illustrates a diagram 200 of a number of different known applications for GPS. In FIG. 2, numerous example devices 206, 204, 202, 208, 210, and 212 are shown receiving and utilizing GPS signals 214, 216, 218, 222, 220 and 224, respectively, from a GPS constellation 226 of satellites (where the individual satellites are not shown). The example devices may include a hand-held GPS receiver 202, an automobile GPS receiver 204, an integrated cellular telephone GPS receiver 206, an integrated personal digital assistant (PDA) GPS receiver 208, an integrated mobile computer (such as a typical "laptop" or "notebook" computer) GPS receiver 210, an integrated computer (non-mobile) GPS receiver 212, or any other similar type of device that may incorporate a GPS receiver.

It is appreciated by those skilled in the art that in the past GPS receivers have typically been stand-alone devices that receive GPS signals from the GPS constellation 226 without any aiding from an external source. However, with Congress' E911 mandate and with the continued growth of wireless communications in both cellular and non-cellular networks, more and more communication devices are beginning to integrate GPS receivers within the communication devices to satisfy the E911 mandate and/or for network assisted aiding to the GPS receiver.

These new integrated communication devices may either be in communication with a cellular telephone communication network through collection nodes such as a base-station tower 228 or with a non-cellular communication network through non-cellular collection point 230. The cellular communication networks may be a TDMA, CDMA, GSM, Wideband CDMA (also known as "W-CDMA" and/or Universal Mobile Telecommunications System "UMTS"), CDMA-2000, General Packet Radio Service ("GPRS"), or Advanced Mobile Phone Service ("AMPS") type of cellular network. The non-cellular communication network may include such networks as BlueTooth®, Wireless Fidelity ("Wi-Fi®") network based on IEEE 802.11, or other similar wireless networks. As an example, the hand-held GPS receiver 202, integrated automobile GPS receiver 204, integrated cellular telephone GPS receiver 206, PDA 208, and mobile computer 210 may be in communication with cellular base-station 228 via signal paths 232, 234, 236, 238 and 240, respectively. Similarly, the hand-held GPS receiver 202, PDA 208, and mobile computer 210 may be in signal communication with the non-cellular connection point 230 via signal paths 242, 246 and 244, respectively.

As an example of an integrated GPS receiver in a non-wireless communication environment, the non-mobile computer 212 may include an integrated GPS receiver (not shown) that is integrated internally on the motherboard, through an internally added peripheral device, or as a connected external peripheral device. In this example, the integrated GPS receiver (not shown) may receive aiding from a network server 248 via network 250 and modem 252. The network 250 may be the well-known plain old telephone service ("POTS'), an Ethernet, the Internet or other similar network. It is appreciated that other devices connected to POTS, Ethernet and the Internet such as vending machines, office and business equipment, or other important equipment also may be utilized in the same fashion as the non-mobile computer 212.

Figure 3:
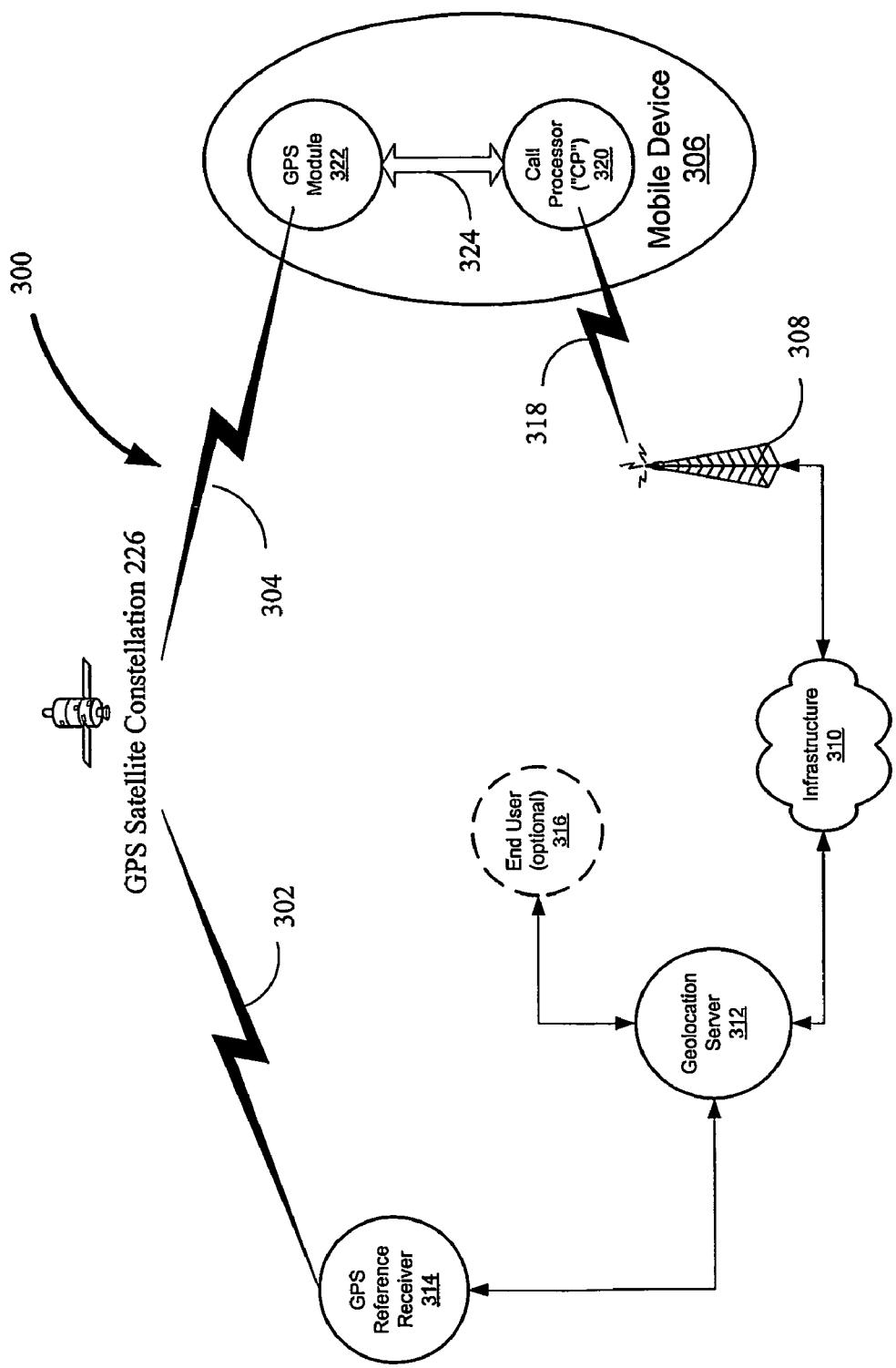
FIG. 3 shows a known wireless mobile positioning system architecture 300 that receives GPS data from the GPS constellation 226 via signal paths 302 and 304.

FIG. 3 shows a known wireless mobile positioning system architecture 300 that receives GPS data from the GPS constellation 226 via signal paths 302 and 304. The architecture 300 may include a mobile device 306, base station 308, wireless network infrastructure 310, Geolocation Server Station 312, GPS reference receiver 314 and optional end user 316. The GPS reference receiver 314 receives GPS signals from the GPS constellation 226 via signal path 302. The mobile device 306 receives GPS signals from the GPS constellation 226 via signal path 304 and is in signal communication with base station 308 via signal path 318. Generally, the mobile device 306 includes a call processor 320 and GPS module 322. Both the call processor 320 and GPS module 322 are in signal communication via signal path 324. The signal path 324 may be a RS232 link, a logical interface via a memory sharing of software data structures or other types of electrical and/or logical interfaces. It is appreciated by those of skill in the art that the GPS module 322 may be implemented as either a separate module and/or device or as a function unit that may be located anywhere within the mobile device 306, including the call processor 320.

Generally, the architecture 300 shown in FIG. 3 requires that the GPS module 322 utilize the same protocol utilized by the Geolocation Server Station 312 in order to receive any GPS aiding information from the Geolocation Server Station 312.

Figure 4:
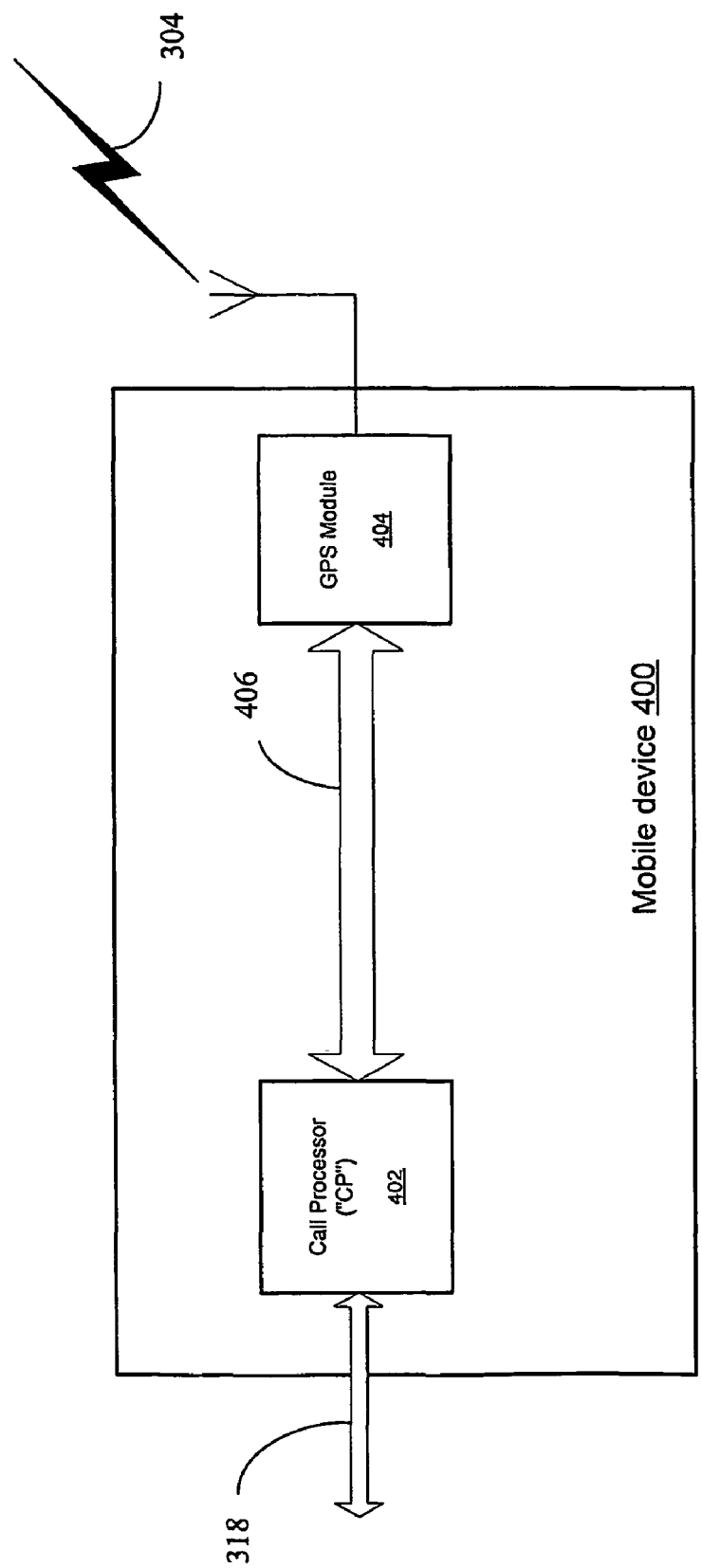
FIG. 4 shows a typical implementation of the mobile device 400 including a call processor 402 in signal communication with a GPS module 404 via signal path 406.

FIG. 4 shows a typical implementation of the mobile device 400 including a call processor 402 in signal communication with a GPS module 404 via signal path 406. The mobile device 400 may be of the example devices 202, 204, 206, 208, 210, and 212 shown in FIG. 2. The call processor 402 is in signal communication with the base station 308 via signal path 318 and the GPS module 404 receives GPS data from the GPS Satellite Constellation 226 via signal path 304. As an example, the signal path 406 may be implemented with a RS232 data link if the call processor 402 and GPS module 404 are physically separate devices. The signal path 406 may also be implemented as a logical interface via a memory sharing of software data structures or other types of electrical and/or logical interfaces.

In typical operation, the mobile device 400 would receive GPS signals 304 from the GPS constellation 226, FIG. 3, and communication signals 318 from the cellular telephone communication network infrastructure 310 through base-station tower 308 or with the non-cellular communication network (not shown) through non-cellular collection point 230, FIG. 2.

The call processor 402, FIG. 4, may be any communication device capable of communication either one-way or two-way with an external communication network such as the cellular telephone communication network infrastructure 310, FIG. 3, or non-cellular wireless or non-wireless network (not shown). The call processor 402 includes dedicated hardware (not shown) and software (not shown) for establishing and managing a telecommunication connection.

Examples of a cellular telephone type of call processor 402 may include a cellular telephone call processing Integrated Dispatch Enhanced Network ("iDEN™") produced by Motorola, Inc., of Schaumberg, Ill., CDMA2000® 1X type chipsets utilized by Nokia of Finland, Sony Ericsson of Sweden, Qualcomm, Inc. of San Diego, Calif., or any similar type of GSM/CDMA/TDMA/UMTS type of communication device capable of communicating with a GPS receiver within GPS module 308. Examples of a non-cellular telephone type of communication device may include SX45 GPS accessory produced by Siemens SA of Germany, any communication device capable of communicating to a BlueTooth®, Wireless Fidelity ("Wi-Fi®") network based on IEEE 802.11, or other similar wireless networks. The GPS module 404 may include any GPS receiver capable of communicating with the call processor 402.

Figure 5:
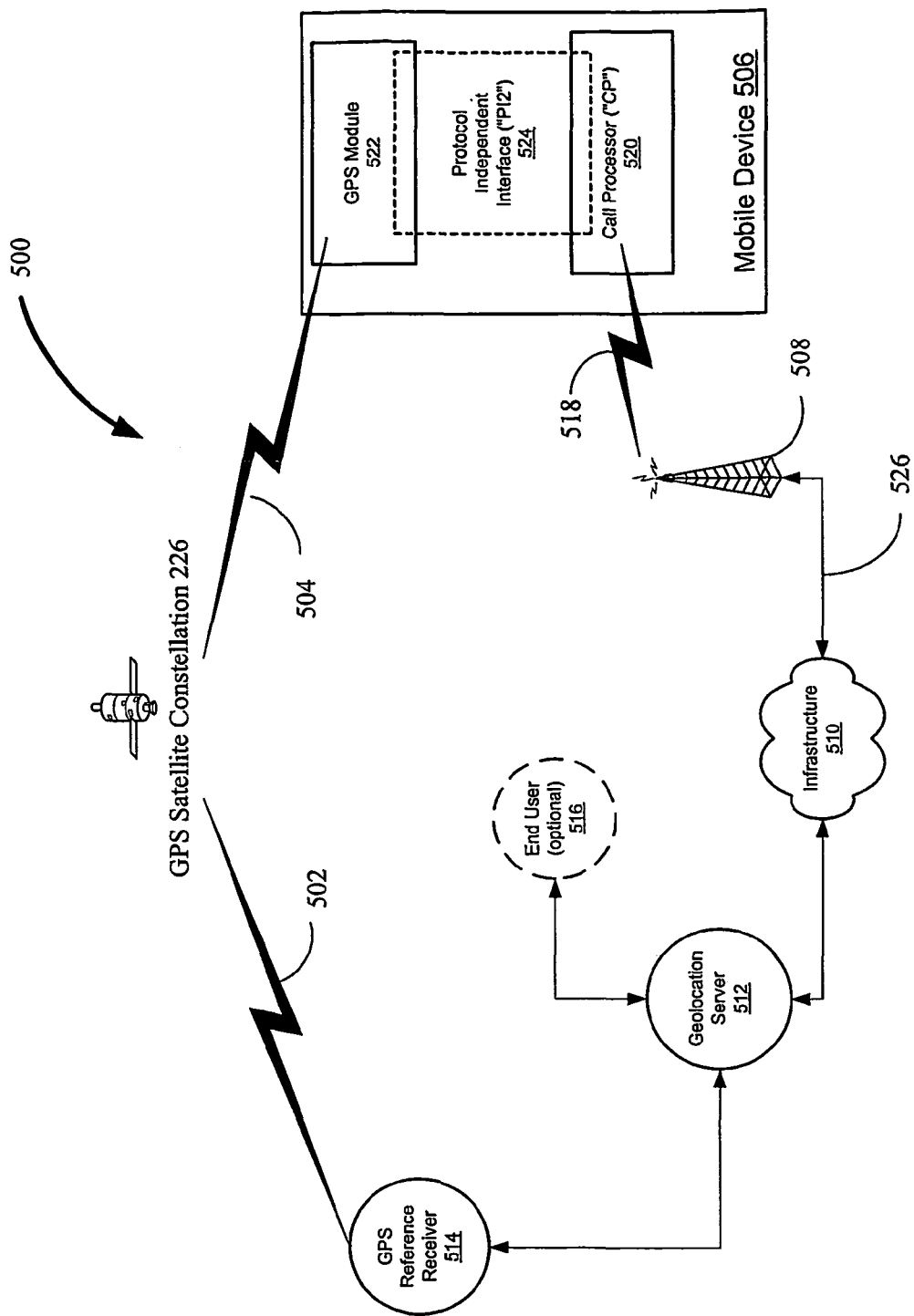
FIG. 5 shows block diagram of an exemplary implementation of a protocol independent interface in a wireless mobile positioning system architecture.

In FIG. 5, an exemplary implementation of a protocol independent wireless mobile positioning system architecture 500 is shown. In FIG. 5, the architecture 500 may include a mobile device 506, base station 508, wireless network infrastructure 510, Geolocation Server Station 512, GPS reference receiver 514, and optional end user 516. The mobile device 506 and GPS reference receiver 514 receive GPS signals from the GPS Satellite Constellation 226 via signal paths 504 and 502, respectively.

The Mobile Device 506 may include a Call Processor 520, GPS module 522 and protocol independent interface (herein known as "PI2") 524. PI2 524 is an interface that allows the GPS module 522 to receive aiding data from the Geolocation Server Station 512 without requiring the GPS module 522 to utilize the same protocol utilized by the Geolocation Server Station 512. Therefore, the PI2 524 enables the GPS module 522 to be free of specific implementations of multiple protocols for different Geolocation Server Stations. The use of the term module, may be an independent module or a subsystem integrated into a main board or integrated circuit.

In operation, each Geolocation protocol may be implemented via a translator in the PI2 524 that translates the Geolocation Server Station 512 protocol to an independent protocol used by the GPS module 522. This allows seamless availability of geolocation information as the Mobile Device 506 hands-off from one wireless communication standard to another, thereby changing the way in which the mobile device 506 receives aiding data and transmits position, or other geolocation results, from the Call Processor 520 to the Geolocation Server Station 512. As a result, each unique geolocation protocol (such as IS-817, IS-801 etc.) for all the different air interfaces utilized in the various places around the world may be served by the GPS device 506 without resetting or reconfiguring the GPS module 522 because the PI2 524 is capable of translating the GPS information from the Geolocation Server Station 512 of the communication system subscribed to by the user (not shown) of the Mobile Device 506 into the protocol utilized by the GPS module 522. An example of the PI2 524 includes but is not limited to the aiding independent interoperability interface ("AI3") developed and owned by SiRF Technology, Inc., of San Jose, Calif.

It is appreciated by those skilled in the art that there are different geolocation standards developed for different types of wireless networks. As an example, the interface 526 between the base station 508 and infrastructure 510 may be any air-interface. The interface 526 is typically controlled by the call processor 520 manufacturer. Typically, the PI2 524 includes two interfaces generally known as the "F" interface (not shown) and "G" interface (not shown).

The F interface, which is the client system interface between the GPS module 522 and Call Processor 520, acts as a bootstrap protocol, ever present, allowing the Call Processor 520 to choose at run-time how the aiding will be conveyed to the GPS module 522 in the aiding encapsulation layer. The Call Processor 520 may choose between an air-interface (such as interface 526 in the case of the end-to-end system architecture) or the G interface. The F interface may perform the following tasks: GPS module 522 hardware management from the Call Processor 520 (power on/off, reset); if available, implicit aiding interface, i.e., sends time and frequency transfer from network (or from Call Processor 520 real time clock) via the Call Processor 520, and approximate Mobile Device 506 position (generally implicit from the network, if it does exists); session opening/closing (i.e., notifying the GPS module 522 that an air-interface connection has been opened/closed); and in a dual-mode Mobile Device 506, notifying the GPS module 522 what air interface is on, thus notifying the GPS module 522 what set of geolocation air-interface protocols to use to dialog with the Geolocation Server Station.

Unlike the F interface, the G interface is utilized to convey GPS aiding information received from the base station 508 to the GPS module 522. Since there are typically many existing Geolocation protocols, the G interface is designed to be usable over a large range of Geolocation standards and air-interface independent, i.e. it is unique for applicable air-interfaces. The PI2 524 may be implemented as a reduction of the applicable Geolocation standards.

In operation, the Call Processor 520 sends position request information and network aiding information in PI2 format to the GPS module 522 through the G interface. In return, the GPS module 522 sends position results or error notification to Call Processor 520 though the same interface. It is appreciated that all Geolocation protocols, including SAMPS, GSM, and C DMA, work under the interaction paradigm. The base station 508 sends back only what the Mobile Device 506 has requested. Generally, the strategy to perform the interaction is highly dependent on the knowledge on the GPS module 522 processing.

Additionally, contrary to many protocol stack levels, Geolocation protocols are application protocols, which means they deal with the semantics (meaning) of the message They do not, therefore, merely transport data from one side to the other side, without error correction and elimination of swapping or repetition as in a TCP-IP stack. As such, any entity that handles the protocol (e.g., decides to request some data) needs to know what that data will be used for, and the meaning of every parameter exchanged over the protocol (i.e., it needs to know what is happening on the GPS side). As such, the implementer of the Geolocation protocol should be GPS "savvy."

Therefore, the PI2 524 utilizes an air-interface Finite State Machine ("FSM") (not shown). Generally, this results in the state in which the FSM currently resides being imposed by the current knowledge of the contents of the GPS memory (not shown), and in the decision to send a request message to complete some incomplete GPS information being built into the FSM itself.

Figure 6:
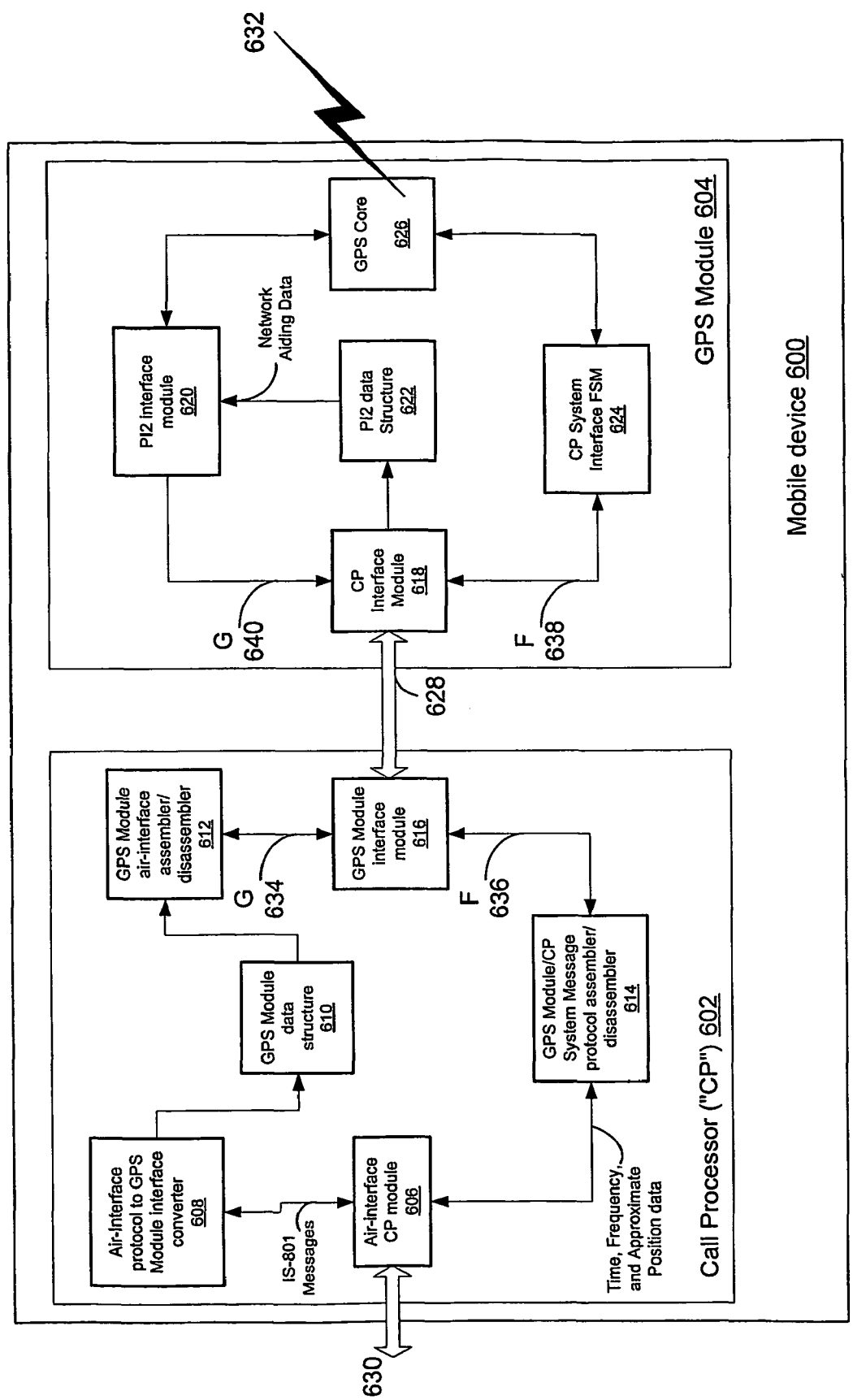
FIG. 6 shows a diagram for an exemplary implementation of a Mobile Device utilizing a FSM in a GSM environment according to FIG. 5.

Turning to FIG. 6, FIG. 6 shows a block diagram for Mobile Device 600 utilizing a FSM. The Mobile Device 600 includes Call Processor 602 and GPS Module 604. Call Processor 602 includes air-interface CP module 606, air-interface protocol to GPS module interface converter 608, GPS module data structure 610, GPS module air-interface assembler/disassembler 612, GPS module/CP System Message protocol assembler/disassembler 614, and GPS Module interface module 616. The GPS Module 604 includes CP interface module 618, PI2 interface module 620, PI2 data structure 622, CP System interface FSM 624, and GPS core 626. The GPS core 626 receives GPS signals from the GPS satellite constellation 226 via signal path 632 and the Air-interface CP module 606 is in signal communication with the base station (not shown) via signal path 630.

FIG. 6 shows the high level architecture of PI2 to be implemented inside an IS-801 based CDMA Mobile Device 600. The Call Processor 602 may communicate with the GPS Module 604 via a signal path (which may include but is not limited to a RS232 link) 628 and hardware lines (for the time and frequency transfers). The signal path 628 may be implemented as a RS232 interface, a logical interface via memory sharing of software, data structures, other electrical and/or logical interfaces. The F and G interfaces 636 and 634 are two separate logical channels for the RS232 interface. The G interface 634 is designed to pass the PI2 aiding data to GPS Module 604. The rest of the aiding data will be passed to GPS Module 604 via the F interface 636. On the GPS Module 604 side, the F interface 638 is a standard GPS (such as SiRFLoc) client interface and the G interface 640 is transparent to any standard air-interface protocols. For the IS-801 Call Processor 602, the PI2 data will be generated via an air-interface protocol to GPS Module interface converter (also known as IS-801 message to PI2) converter. The PI2 data is packed into the G message format via a GPS Module air-interface assembler/dissemble (also known as a PI2 interface message handler) 612 before passing to GPS Module 604 via the signal path 628. The Call Processor 602 obtains the time, location and frequency data from appropriate air-interface messages. The location data is passed to GPS Module 604 via a "F" interface 636 message (the approximate Mobile Device 600 Position Response message). The time and frequency data are passed to GPS Module 604.

The PI2 data structure contains information on ionospheric, satellite ephemeris and the Mobile Device 600 position request parameters. All of this data is typically byte oriented. The PI2 data structure needs to be reset to 0 after the Call Processor 602 establishes a communication link with the base station (not shown). There are a few sources of aiding data that include approximate Mobile Device 600 position, location request parameters, ephemeris data, GPS time, and frequency. The first source can be obtained with knowledge of the position of the base station. The base station position can be used as the approximate Mobile Device 600 position. There are two ways to get the base station position data IS-95 implicit message and IS-801 protocol messages. The IS-95 Paging Channel "System Parameter Message" contains the BS position data of longitude and latitude. Since the altitude data is not available in this message, the altitude of the approximate Mobile Device 600 position will be set to 0. The Call Processor 602 may also get the base station position data via the IS-801 "Provide Base Station Almanac" message. This message contains sufficient data, which can be used to compute the longitude, latitude and altitude of the base station. In this method, the Call Processor 602 will need to send the IS-801 "Request Base Station Almanac" message before the PDE can respond with the "Provide Base Station Almanac" message. This typically requires additional message handling compared to the IS-95 implicit method.

The location request parameters may also aid in locating the Mobile Device 600. The IS-801 "Request Location Response" message provides data to compute the number of fixes and time between fixes for PI2 location request parameters. Additionally, with the ephemeris data, the IS-801 "Provide GPS Ephemeris" message provides all data to be converted to the ephemeris data for RI2.

Aided GPS time also allows for a reduction in GPS time uncertainty, the GPS Module 604 may synchronize the GPS clock with the CDMA system clock via a time transfer method. The Call Processor 602 synchronizes the handset clock with the CDMA system time, which may be obtained from the CDMA Sync Channel "Sync Channel Message." Similarly, frequency aiding my be used to reduce the GPS frequency uncertainty, the GPS Module 604 may synchronize the GPS clock with the Call Processor 602 and base station clock via the frequency transfer method.

In operation, the Call Processor 602 software handles the communication with the base station for network aiding data via the IS-801 and IS-95 message protocols. The PI2 Data consist of Mobile Device 600 position request parameters as well as the ephemeris aiding data. The C all Processor 602 may compute the Mobile Device 600 position request parameters by using the number of position fixes data to be retrieved from the IS-801 "Request Location Response" message. The Call Processor 602 generates the ephemeris aiding data in PI2 format by retrieving the compressed ephemeris data from the IS-801 "Provide GPS Ephemeris" message. The Call Processor 602 shall store the Mobile Device 600 position request parameters and the ephemeris aiding data into the PI2 data structure.

The Call Processor 602 may use the Base station position data as obtained from the IS-95 "System Parameter Message" during the Mobile Device 600 Idle State and uses it as the approximate Mobile Device 600 position. Due to the lack of altitude information of the base station in the IS-801 "System Parameter Message", the Call Processor 602 sets the altitude of the approximate Mobile Device 600 position to 0.

The Call Processor 602 may choose to obtain the BS position data from the IS-801 "Provide Base Station Almanac" message. By choosing this method, the Call Processor 602 needs to send the IS-801 "Request Base Station Almanac" message during the Mobile Device 600 System Idle State or Mobile Device 600 Control on the Traffic Channel State. Compared to the implicit IS-95 method, this method requires the processing of two IS-801 messages and with time delay—later than Mobile Device 600 Idle State. Among the multiple base station coordinates found in the "Base Station Almanac" message, the Call Processor 602 shall pick up the base station with which it has the direct radio connection as the reference base station for the approximate Mobile Device 600 position.

The Call Processor 602 uses the CDMA system time as obtained from the IS-95 "Sync Channel Message" as the Call Processor 602 time. The C all Processor 602 sends timing information to GPS Module 604 via the time transfer method. Similarly, the Call Processor 602 synchronizes its clock frequency with the GPS Module 604 frequency via the frequency transfer method.

The Call Processor 602 sends the PI2 data to GPS Module 604 via the G interface 634 "PI2 Data Message." The Call Processor 602 sends the approximate Mobile Device 600 position, time and frequency transfer data via appropriate F interface 636 messages.

To provide the PI2 based location service, the Call Processor 602 sets appropriate values to certain data fields in the IS-801 messages. When the Call Processor 602 receives the position result from the GPS Module 604 via the F interface 636, it converts the position result into IS-801 message format to be sent to PDE.

In response to the IS-801 "request MS Information" message sent from PDE, the Call Processor 602 sets the REQ_PAR_RECORD of the IS-801 "Provide Mobile Device 600 Information" message as follows:
1. GPS_ACQ_CAP and LOC_CALC_CAP of the RESP_PAR_RECORD are set to the values described as follows: GPS_ACQ_CAP (12 bits)—Bit 4 (GPS Ephemeris) and bit 7 (GPS Autonomous Acquisition Capable) are set to '1', other bits are set to '0'; and
2. LOC_CALC_CAP (12 b its)—Bit 5 (Location Calculation Capable using Ephemeris) and bit 7 (Autonomous Location Calculation Capable) are set to '1', other bits are set to '0'.

If the Call Processor 602 chooses to obtain the approximate Mobile Device 600 position via the IS-801 base station Almanac data, then the Call Processor 602 sets the REQ_PAR_RECORD of the IS-801 "Request Base Station Almanac" message as follows: EXT_BS_ALM (1 bit)—set to 1.

The Call Processor 602 sends the IS-801 "Request GPS Ephemeris" message to obtain the Ephemeris aiding data. The Call Processor 602 sets the REQ_PAR_RECORD of the IS-801 "Request GPS Ephemeris" message as follows: AB_PAR_REQ (1 bit)—set to 1.

After receiving the "T" interface "Position Result" message from the GPS Module 604, the Call Processor 602 converts the position result data into the IS-801 "Provide Location Response" message as follows:
1. TIME_REF_CMDA (14 bits). The Call Processor 602 converts GPS time to CDMA system time. The GPS time is defined by the MEAS_GPS_WEEK and MEAS_GPS_SECONDS of the "F" interface "Position Result" message. The MEAS_GPS_WEEK is an extended GPS week number and the MEAS_GPS_SECONDS is the number of elapsed time since the beginning of the current GPS week, in units of $1/1000$ seconds. The CDMA system time is defined in 1.2 of TIA/EIA-95-B. The TIME_REF_CDMA shall be set to (t/50) mod 16384 as defined in IS-801, where t is CDMA system time in frames.
2. LAT (25 bits) LAT=scale_factor_meas_lat×MEAS_LAT (Position Result message) LAT is in units of $180/2^{25}$ and MEAS_LAT is in units of $180/2^{32}$, therefore scale_factor_meas_lat=$(180/2^{32})/(180/2^{25})=1/2^7$;
3. LONG (26 bits) LONG=scale_factor_meas_long×MEAS_LONG (Position Result message). LONG is in units of $360/2^{26}$ and MEAS_LONG is in units of $360/2^{32}$, therefore scale_factor_meas_long=$(360/2^{32})/(360/2^{26})=1/2^6$;
4. LOC_UNCRTNTY_ANG (4 bits), LOC_UNCRTNTY_A (5 bits), LOC_UNCRTNTY_P (5 bits) If the Bit 0 (LSB) of the OTHER_SECTIONS (Position Result message) is equal to '0' (No horizontal error section in the data), then LOC_UNCRTNTY_ANG=0, LOC_UNCRTNTY_A='11111' (Not computable), LOC_UNCRTNTY_P='11111' (Not computable);
5. FIX_TYPE (1 bit) If POS_TYPE (Position Result message)=0x00 then FIX_TYPE=0, If POS_TYPE=0x01 then FIX_TYPE=1;
6. VELOCITY_INCL (1 bit), VELOCITY_HOR (9 bits), VELOCITY_VER (8 bits), HEADING (10 bits) VELOCITY_INCL (IS-801, 1 bit)=Bit 2 of OTHER_SECTIONS (Position Result message); If VELOCITY_INCL='1', VELOCITY_HOR=scale_factor_hv×HOR_VEL (Position Result message) scale_factor_hv=0.0625/0.25=0.25; HEADING=scale_factor_heading×HEADING (Position Result message); scale_factor_heading=$(360/2^{16})/(360/2^{10})=2^{-6}$; If VELOCITY_INCL='1' and FIX_TYPE='1', VELOCITY_VER (IS801, 8 bits)=VER_VEL (Position Result message); If VELOCITY_INCL='0' then the IS-801 "Provide Location Response" shall not include VELOCITY_HOR, VELOCITY_VER and HEADING parameters;
7. CLOCK_INCL (1 bit), CLOCK_BIAS (18 bits), CLOCK_DRIFT (16 bits) CLOCK_INCL=Bit 3 of OTHER_SECTIONS (Position Result message); If CLOCK_INCL='1', CLOCK_BIAS=scale_factor_clk_bias×CLK_BIAS (Position Result message)+offset_clk_bias; Where, scale_factor_clk_bias=1e9; offset_clk_bias=13,000 ns.
8. HEIGHT_INCL (1 bit), HEIGHT (14 bits) HEIGHT_INCL=Bit 1 of OTHER_SECTIONS (Position Result message); If HEIGHT_INCL='1', HEIGHT=scale_factor_height×HEIGHT (Position Result message) scale_factor_height=0.1; and
9. LOC_UNCRTNTY_V (5 bits) If HEIGHT_INCL '1', LOC_UNCRTNTY_V=HEIGHT_STD_ER (Position Result message).

The Call Processor 602 receives the IS-801 "Provide Base Station Almanac" message from the PDE in response to the IS-801 "Request Base Station Almanac". This message provides an alternative to IS-95 implicit method to obtain the approximate Mobile Device 600 position data.

The message mapping from the IS-801 "Provide Base Station Almanac" to "F" interface "Approximate Mobile Device 600 Position Response" is described in this section. The field names of "F" interface "Approximate Mobile Device 600 Position Response" data are labeled with (F). The field names of the IS-801 "Provide Base Station Almanac" are labeled with (IS-801).

The "Provide GPS Ephemeris" message provides the ephemeris data as part of the PI2 interface data. Depending on the size of the ephemeris data set, the PDE may send the IS-801 "Provide GPS Ephemeris" in several parts. The total number of parts and the part number of the message are indicated in the elements of TOTAL_PARTS and PART_NUM, respectively. When the Call Processor 602 receives all parts of the ephemeris data, it maps them to the PI2 structure.

In operation, the Call Processor 602 interacts with the GPS Module 604 via the "F" interface messages. The Call Processor 602 shall send the PI2 data to GPS Module 604 whenever the new Call Processor 602 data is available (without the request from GPS Module 604). There is no interaction between the CP and the GPS Module 604 via the PI2 interface.

The IS-801 session of the Call Processor 602 may be opened before the GPS Module 604 is powered on or before the GPS Module 604 session (set with the PI2 interface flag) is opened. The GPS Module 604 session shall be closed before the closing of the IS-801 session. When the IS-801 session is opened, the Call Processor 602 shall reset the PI2 data structure.

If the IS-801 session is opened before the GPS Module 604 is powered on, the CDMA system time will be available before the Call Processor 602 is ready to perform the time transfer with the GPS Module 604. In this scenario, the Call Processor 602 may also get the approximate Mobile Device 600 position data before the GPS Module 604 is ready to send the "F" interface "Approximate Mobile Device 600 Position Request" and hence the GPS performance of the GPS Module 604 will be more optimized.

The Call Processor 602 can obtain the approximate Mobile Device 600 position via either the IS-95 implicit method (from IS-95 "System Parameter Message") or the IS-801 messages. The IS-95 implicit method is considered to be the faster way of getting the BS position compared to the IS-801 messages. The IS-95 "System Parameter" is a required message to be sent to the Call Processor 602 from the base station during the CDMA Mobile Device 600 Idle State, regardless of the IS-801 session. On the other hand, the IS-801 "Request/Provide Base Station Almanac" not only requires two interactive message exchanges, but also will not invoked until the IS-801 session is opened.

When the Call Processor 602 converted a complete new set of ephemeris data from BS via the IS-801 interface, the PI2 data is considered to be ready. The Call Processor 602 shall send the PI2 data to GPS Module 604 less than 2 seconds after the PI2 data is ready, without the asking from the GPS Module 604. The Call Processor 602 should periodically request the base station to send the ephemeris data at a rate no longer than 2 hours. The faster the rate, the more optimized the GPS performance.

The GPS Module 604 shall periodically send the position result to the Call Processor 602 via the "T" interface based on the number of position fixes as specified in the PI2 data structure. The Call Processor 602 shall set the number of position fixes in the PI2 structure even if the data is not available.

Figure 7:
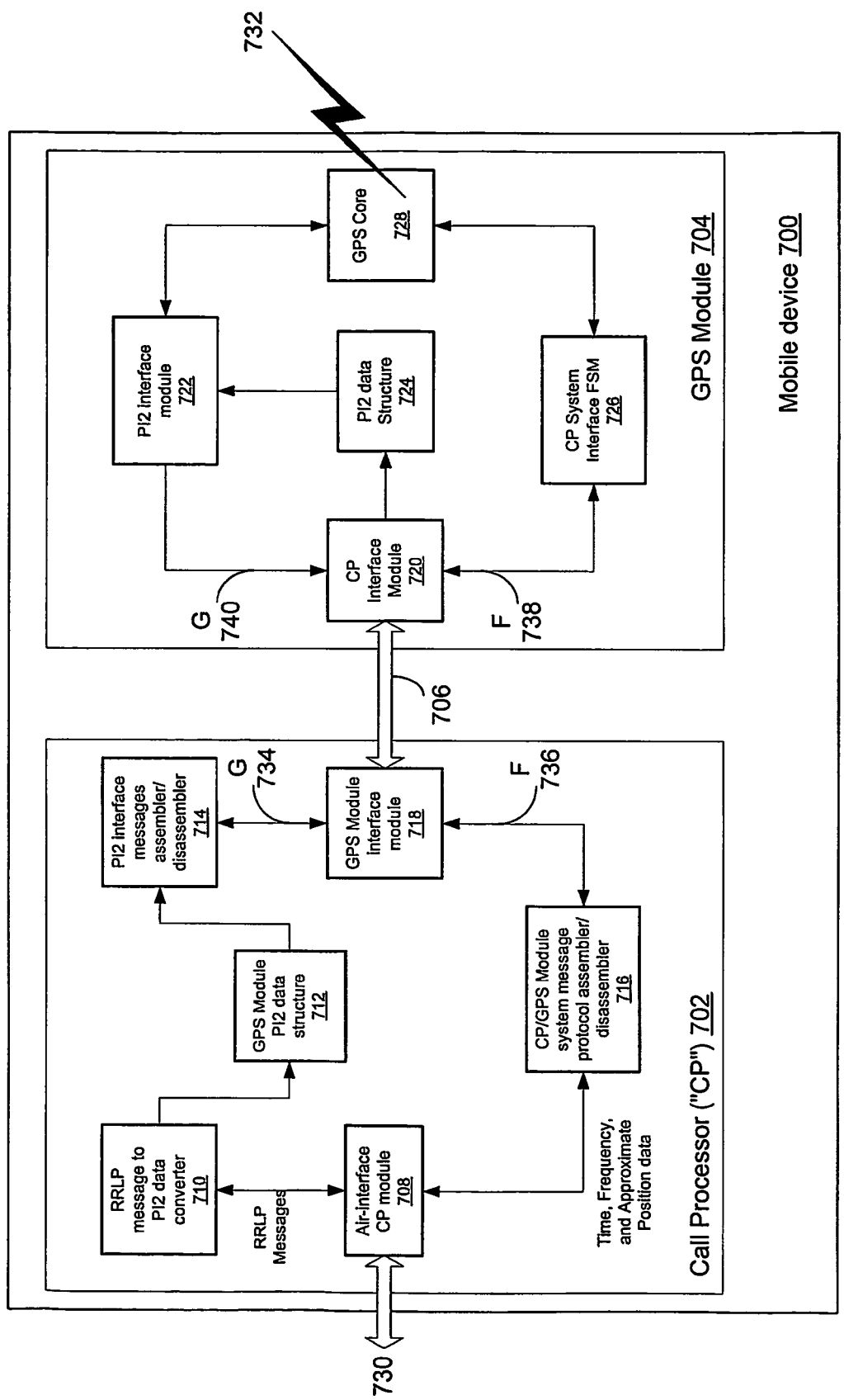
FIG. 7 shows a block diagram for an exemplary implementation of a mobile device utilizing a FSM in a CDMA environment according to FIG. 5.

Turning to FIG. 7, FIG. 7 shows a block diagram for Mobile Device 700 utilizing a FSM in a GSM environment. The Mobile Device 700 includes Call Processor 702 and GPS Module 704 in signal communication via signal path 706. Again, the signal path 706 may be implemented as a RS232 interface, a logical interface via memory sharing of software data structures or other electrical and/or logical interfaces. Call Processor 702 includes air-interface CP module 708, RRLP message to PI2 data converter 710, GPS module PI2 data structure 712, PI2 interface messages assembler/disassembler 714, CP/GPS Module System Message protocol assembler/disassembler 716, and GPS Module interface module 718. The GPS Module 704 includes CP interface module 720, PI2 interface module 722, PI2 data structure 724, CP System interface FSM 726, and GPS core 728. The GPS core 728 receives GPS signals from the GPS satellite constellation 226 via signal path 732 and the Air-interface CP module 708 is in signal communication with the base station (not shown) via signal path 730.

The block diagram of the Mobile Device 700 is a high level architecture of PI2 to be implemented inside the RRLP-based handset (i.e, a GSM base cellular telephone). The Call Processor 702 may communicate with the GPS Module 704 via a signal path 706 and hardware lines (for the time and frequency transfers) as described in FIG. 7. The F 736 and G 734 interfaces are two separate logical channels for the RS232 interface 706. The G interface 734 may be designed to pass the PI2 aiding data to the GPS Module 704. The rest of the aiding data will be passed to GPS Module 704 via the P interface 736. On the GPS Module 704, the F interface 738 may be a standard GPS client interface (such as SiRFLoc owned by SiRF Technology, Inc.) and the G interface 740 is transparent to any standard air-interface protocols. The Call Processor 702 may generate the PI2 data via the Air-interface protocol to RRLP Message to PI2 data converter 710. The PI2 data will be packed into the G message format via the PI2 Interface Messages assembler/disassembler 712 (such as a PI2 interface message handler) before passing to GPS Module 704 via the signal path 706. The Call Processor 702 may obtain the time and reference location data from appropriate RRLP air-interface messages and pass them to GPS module 704 via the appropriate F interface 736 messages through the CP/GPS Module System Message protocol assembler/disassembler 716.

The PI2 interface may be utilized by the Call Processor 702 and notified to the GPS module 704 by a special "air-interface" code in the session opening message of the F interface 736. After this, all implicit assistance (such as Time transfer, Frequency transfer) may be transmitted over the F interface 736. If available, the approximate position of Mobile Device 700 also may be transmitted from the base station 518, through the Call Processor 702, to the GPS Module 704 over the F interface 736. The GPS module 704 may then respond with a Mobile Device 700 position report over the F interface 738.

It is appreciated that the PI2 interface is typically defined by a large data structure that may be implemented as a memory section (not shown). Generally, all the information present in the interface has a predetermined position in this large data structure. To signify the validity of every piece of information, a validity flag also may be assigned to every field in this structure. The transmission of the information would then be a "read and transmission byte by byte" of the full structure in a predetermined order (MSB first, etc.). The Client side may have a similar data structure, and is filled out byte by byte as soon the information comes. A single checksum test may be made on the full structure for validating it.

It is appreciated that in some cases, not all ephemeris will be valid, and in theory, the message may be shortened by sending only the ephemeris slots actually having valid information. However, this is preferably avoided so that the memory mirroring mechanism does not depend on the meaning of the message. A way to avoid this is to choose the convention of placing all unused fields (including the validity fields) to a value of "0". A simple compression mechanism, sending the number of consecutive bits set to zero, instead of the bits themselves, could then be used for the same purpose. In this approach, a mechanism could utilize a unambiguous special metacharacter, preceding a fixed field indicating a number of repetitions of consecutive bits set to "0" instead of the bits themselves. In this situation, the contents of the memory mirroring structure would be strictly composed of ephemeris information and possibly ionospheric parameters.

It is appreciated by those skilled in the art that both the F 736 and G 734 interface may be transmitted over any serial link between the Call Processor 702 and GPS Module 704. An RS232 has been presented as an example implementation only and it is appreciated that any other serial link will function equally well. Additionally, in the situation that both the Call Processor 702 and GPS Module 704 are integrated on the same semiconductor die, many other techniques for passing data between the Call Processor 702 and GPS Module 704 may be used including, but not limited to, sharing a common memory module or system (or subsystem) bus.

As an example implementation of the F and G interfaces 736 and 734, the serial link may be a bi-directional TTL-level communication interface that is utilized to exchange messages between the Call Processor 702 and the GPS Module 704. Two hardware lines may be utilized for time and frequency transfer. As an example, the PI2 interface may utilize a generic packet format where a TYPE_FIELD may be "0x01", corresponding to either an "Air-Interface Message" or a "PI2 message." To switch to the PI2 interface in a Session Opening Request message, the Call Processor 702 may notify the GPS Module 704 that it shall send the aiding data in "PI2" by using an appropriate value in a "SESSION_OPEN_REQ_INFO" format. It is appreciated that, aside from the "PI2", the Call Processor 702 and GPS Module 704 may support other air-interfaces that may be activated at run-time using the appropriate value for the "SESSION_OPEN_REQ_INFO" field.

The PI2 packet structure utilizes PI2 segments that may be defined and sent in a PAYLOAD field as shown in following table:

TABLE 1

Example PI2 Packet Structure

| HEADER | LENGTH | LOGICAL CHANNEL | PAYLOAD MSG_ID | SEGMENT | CHECKSUM | TERMINATOR |
|---|---|---|---|---|---|---|
| 2 Bytes | 2 Bytes | 1 Byte | 1 Byte | M Bytes | 2 Bytes | 2 Bytes | where MSG_ID is the Message Identifier and SEGMENT is the Message Segment.

As an example, a PI2 segment format may include three fields as shown in Table 2. The first byte presents the total number of segments used for transporting the PI2 message. The second byte is the segment index starting with 1. The last field is the compressed PI2 data with a maximum size of 1016 bytes.

TABLE 2

PI2 Segment Format
PAYLOAD

| | | SEGMENT | |
|---|---|---|---|
| MSG_ID | NUM_OF_SEGMENTS | SEGMENT_INDEX | COMPRESSED_AI3_DATA |
| 1 Byte | 1 Byte | 1 Byte | <=1016 Bytes | where NUM_OF_SEGMENTS is the number of segments and the PI2 data may be sent in several segments. This field may indicate the total number of segments for a complete set of PI2 data. In this case, 0 is an invalid number.

The SEGMENT_INDEX is the Segment Index and the value of this field may be the sequence number of the PI2 data segment transported by this message. Its range may be from 1 to 255. The last message of the PI2 data set has SEGMENT_INDEX equal to NUM_OF_SEGMENTS and again 0 is an invalid number for this field.

The COMPRESSED_PI2_DATA is Compressed PI2 data and this field may be a section of the compressed PI2 data.

Each PAYLOAD field in a PI2 packet may have a maximum total size of 1019 Bytes, and therefore, only transports a maximum of 1018 bytes in the SEGMENT field. In this example, as every segment has a 2-byte header, if the size of the compressed PI2 data is larger than 1016 Bytes, it needs to be segmented; each segment shall be sent sequentially in a separate packet.

It is appreciated that in this example, the size of some of the messages may be quite large. As an example, at a 9600 baud rate, it may take about 2.14 seconds to transmit the PI2 Data message with eight visible ephemeris and without Almanac data.

Additionally, not all the Data in a message will be valid, which means there are a lot of fields set to 0. A simple data compression algorithm should significantly reduce the size of the data to be transmitted. The data compression algorithm may be a lossless type of compression and may manipulate byte streams without regard to what the bytes mean.

The data compression algorithm applied to all PI2 messages may be a "packbits" method, which is a simple and popular variant of run-length encoding method. A run is a group of identical consecutive characters. Each run is coded as a 2-byte header that describes what kind of run it is and its length, and one or more bytes that contain the data. In all cases, the header may be split into two sections: its MSB describes whether it is a literal run (uncompressed) or a fill run (compressed), and the next 15 bits specify the length of the run, as shown in Table 3.

TABLE 3

RLL Compression-Header Format

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RUN_INDICATOR_BIT<br>0 = uncompressed<br>1 = compressed | | | | | | | LENGTH (bytes) | | | | | | | | |

In this example, a literal run is a run of literal bytes (i.e. bytes which are stored rather than compressed). In this case, the RUN_INDICATOR_BIT is 0 and the lower 15 bits specify the length of the run of the literal bytes. The literal bytes then may be encoded directly after this header.

A fill run is a sequence of bytes where all the bytes are identical. In this case, the RUN_INDICATOR_BIT is 1 and the lower 15 bits specify the length of the run. The header is followed by the byte which should be copied the given number of times. One example is given as follows to show how the data compression algorithm may works.

Origin byte stream: 0x01 0xFF 0x00 0x89 0x00 0x00 0x00 0x00 0x00 0x00 0x00 0x12.

After compression: 0x00 0x04 0x01 0xFF 0x00 0x89 0x80 0x07 0x00 0x00 0x01 0x12

An example data decompression algorithm should also be simple. The GPS Module 704 would get the RUN_INDICATOR_BIT and the length. If the RUN_INDICATOR_BIT is 0, the next LENGTH bytes are just copied. If the RUN_INDICATOR_BIT is 1, the next coming byte shall be copied "LENGTH" number of times. For example:

Compressed data: 0x80 0x08 0x00 0x00 0x05 0x44 0x00 0x01 0x66 0x45.

After decompression: 0x00 0x00 0x00 0x00 0x00 0x00 0x00 0x00 0x44 0x00 0x01 0x66 0x45.

Aside from ACK/NACK/ERROR messages, the PI2 messages may have a predetermined position in a large structure. To signify the validity of every piece of information, a validity flag also may be assigned to each group of information in this structure. This special arrangement may be chosen to facilitate the conversion of this protocol as a shared memory between tasks on a same processor. For now, the PI2 protocol may be specifically designed to be used over a serial link, between two separate processors.

As an example, a PI2 Request may be strictly composed of position request information, ionospheric parameters, acquisition assistance data, satellite ephemeris and almanac. Other aiding data received over the air interface protocol can be delivered to the GPS Module 704 through the F interface 736 (for example, approximate user location, time and frequency transfer).

In this case, all information present in the PI2 Request may have a predetermined position in a large structure. To signify the validity of every piece of information, a validity flag also may be assigned to each group of information in this structure.

The PI2 Request and Response may be defined as large data structures. These messages may be implemented by utilizing a memory mirroring mechanism. For every message, the same memory structure is defined on the Call Processor 702 and GPS Module 704 sides. One set of memory may be defined per direction.

The transmission of the information may be a "read, compression, and transmission byte-by-byte" of the full structure on the transmitting side. The same data structure on the receiving side may be filled out byte-by-byte as soon the information arrives and is decompressed.

The Call Processor 702 may send the PI3 Request message at the opening of the "PI2" session, even when the PI2 data structure has not been updated. The GPS Module 704 may use the validity flags in the data structure itself to determine what information is relevant.

Typically, neither the GPS Module 704 nor Call Processor 702 may send any PI2 message before a Session Opening Request/Response pair of "RI2" type, or after a Session Closing Request/Response pair have been exchanged over the F interface 736, 738. When the session has been identified as a "PI2" type, the PI2 messages shall be exchanged.

For every message received, an ACK/NACK/ERROR message is typically returned, to speed up the repetition of the message if improperly received. This mechanism will preferably be used on a local serial link, and has no strong error detection and correction mechanism.

As an example, the GPS Module 704 reception procedures may include the following steps. First, upon receiving an PI2 Request message after an PI2 session is open, the GPS Module 704 may examine the received PI2 message. If the PI2 message is transported in several packets, the GPS Module 704 reassembles the segmented data. After receiving all packets of an PI2 message correctly the GPS Module 704 decompresses the reassembled data and copies it to the structure on the GPS Module 704 side. Second, upon receiving a PI2 message before a PI2 session is open, the GPS Module 704 shall silently discard the message. Third, if segment data is missing, the whole message is discarded.

Similarly, an example of the GPS Module 704 Transmission Procedure may include the following steps. First, upon receiving a PI2 Request message with POS_REQ_FLAG set to 1, the GPS Module 704 examines if the requested location method is supported. If LOCATION_METHOD is set to 0x00 or 0x03, and the GPS Module 704 does not support the requested location method(s), the GPS Module 704 sends an PI2 Response message with GPS_MEAS_FLAG set to '1' (valid GPS measurement section) and MEAS_ERROR_STATUS set to "Requested Location Method Not Supported". If LOCATION_METHOD is set to 0x01 or 0x02, and the GPS Module 704 does not support the requested location method(s), the GPS Module 704 sends an PI2 Response message with POSITION_RESULTS_FLAG set to '1' (valid position section) and POSITION_ERROR_STATUS set to "Requested Location Method Not Supported."

As an example for a Mobile Device 700 based location method, regardless of the time set by MAX_RESP_TIME field found in the PI2 Request, upon completing a position fix, the GPS Module 704 sends a PI2 Response providing the position fix, with POSITION_RESULTS_FLAG set to '1' (valid position section) and POSITION_ERROR_STATUS set to '0' (valid position).

For a Mobile Device 700 assisted location method, regardless of the time set by MAX_RESP_TIME field found in the PI2 Request message, upon getting enough valid GPS measurements, the GPS Module 704 sends a PI2 Response message providing the GPS measurements, with GPS_MEAS_FLAG set to '1' (valid GPS measurement section) and MEAS_ERROR_STATUS set to '0' (valid GPS measurements).

Additionally, for a Mobile Device 700 based location method, upon timeout of the MAX_RESP_TIME field found in the PI2 Request, and no position fix yet, GPS Module 704 shall send a PI2 response message with POSITION_RESULTS_FLAG set to '1' (valid position section) and POSITION_ERROR_STATUS set to "Need More Time".

Similarly, for a Mobile Device 700 assisted location method, upon timeout of the MAX_RESP_TIME field found in the PI2 Request message, and not enough valid GPS measurements yet, the GPS Module 704 shall send an PI2 response message with GPS_MEAS_FLAG set to '1' (valid GPS measurement section) and MEAS_ERROR_STATUS set to "Need More Time".

For a Mobile Device 700 based location method, upon reaching the end of the GPS search domain, and with no position found, GPS Module 704 sends an PI2 response message with POSITION_RESULTS_FLAG set to '1' (valid position section) and POSITION_ERROR_STATUS set to "No fix available after full search".

For a MS assisted location method, upon reaching the end of the GPS search domain, and with not enough valid GPS measurements, the GPS Module 704 sends a PI2 response message with GPS_MEAS_FLAG set to '1' (valid GPS measurement section) and MEAS_ERROR_STATUS set to "No Enough Satellites Tracked".

If the GPS Module 704 needs more ephemeris aiding data, GPS Module 604 may send a PI2 response message with POSITION_RESULTS_FLAG set to '1' (valid position section) and POSITION_ERROR_STATUS set to "GPS Aiding data missing".

If the GPS Module 704 needs more Acquisition Assistance data, the GPS Module 704 sends a PI2 Response message with GPS_MEAS_FLAG set to '1' (valid GPS measurement section) and MEAS_ERROR_STATUS set to "GPS Aiding Data Missing".

Optionally, and according to criteria to be defined on a case by case, the GPS Module 704 may add an Almanac reference date section in any PI2 Response message. This capability allows the Call Processor 702 to evaluate the age of the almanacs in the GPS Module 704, and possibly to replace them with a newer one, by a PI2 Request message.

Examples of the Call Processor 702 Reception Procedures include upon reception of an Air Interface Protocol Message (or a group thereof), the Call Processor 702 fills (while reformatting if necessary) the relevant fields of the "PI2 data structure" on the Call Processor 702 side, using the received Air-Interface Message information. If a PI2 session is currently open, the Call Processor 702 shall send the PI2 Request message when the information or part of it has been updated in the Call Processor 702 structure without any request.

Upon reception of a PI2 Response message, the Call Processor 702 examines the received PI2 message. If the PI2 message is transported in several packets, the Call Processor 702 reassembles the segmented data. After receiving all packets of a PI2 message correctly the Call Processor 702 decompresses the reassembled data and copies it to the structure on the Call Processor 702 side.

Upon receiving a PI2 message before a PI2 session is open, the Call Processor 702 discards the message. If segment data is missing, the whole message is discarded.

As an example of Call Processor 702 Transmission procedures, within 2 seconds after the Session Opening Notification Message with the SESSION_OPEN_STATUS field set to Session Opening Succeeded is received, the Call Processor 702 starts to send the PI2 Request message regardless of whether it has valid aiding information or not. The PI2 Request is compressed and only the compressed data stream is sent to the GPS Module 704. If the size of the compressed data stream is larger than the maximum, it may be segmented into several data packets. The data packets are sent sequentially in the order they have been segmented.

Example exception procedures for the PI2 Request message from Call Processor 702 to GPS Module 704 include on the Call Processor 702 side, when the Call Processor 702 sends a PI2 Request message, the Call Processor 702 expects an ACK/NACK/ERROR message back from the GPS Module 704, within 3 seconds after transmission of the message.

If the Call Processor 702 does not receive anything within 3 seconds, it again sends the PI2 Request message. The Call Processor 702 can repeat the sequence up to three times. After the third repetition, the Call Processor 702 closes the PI2 channel.

If the Call Processor 702 receives an ACK/NACK/ERROR message with the ACK/NACK/ERROR field set to 0xFE the Call Processor 702 closes the PI2 channel.

If the Call Processor 702 receives an ACK/NACK/ERROR message with the ACK/NACK/ERROR field set to 0xFF the Call Processor 702 immediately sends the same message again. After three repetitions, the Call Processor 702 closes the PI2 channel. Similarly on the GPS Module 604 side, as soon as the GPS Module 704 receives the message from the Call Processor 702 and decodes the message properly, the GPS Module 704 examines the value of the ICD_REV_NUM field. Then GPS Module 704 may send an ACK/NACK/ERROR message with the ACK/NACK/ERROR field set to 0x00 within 3 seconds of the reception. Alternatively, GPS Module 704 may send an ACK/NACK/ERROR message with the ACK/NACK/ERROR field set to 0xFE within 3 seconds of the reception. If the message cannot be decoded properly, GPS Module 704 sends an ACK/NACK/ERROR message with the ACK/NACK/ERROR field set to 0xFF within 3 seconds.

If segments of the same message are received out of order, the GPS Module 704 throws away the segments already received, ignores the remaining segments and sends an ACK/NACK/ERROR message with the ACK/NACK/ERROR field set to 0xFF within 3 seconds.

Additionally, for a PI2 Response message sent from GPS Module 704 to Call Processor 702, the GPS Module 704 expects an ACK/NACK/ERROR message back from the Call Processor 702 within 3 seconds after transmission of the message. If the GPS Module 704 does not receive anything within 3 seconds, the GPS Module 704 sends the PI2 Response again. It may repeat the sequence up to three times. After the third repetition, the GPS Module 704 stops sending the message. If the GPS Module 704 receives an ACK/NACK/ERROR message with the ACK/NACK/ERROR field set to 0xFF, the GPS Module 704 immediately sends the same message again. After three repetitions, the GPS Module 704 stops sending the message.

On the Call Processor 702 side, as soon as the Call Processor 702 receives the message from the GPS Module 704 and decodes it properly, the Call Processor 702 sends an ACK/NACK/ERROR message with the ACK/NACK field set to 0x00 within 3 seconds of the reception. If the message cannot be decoded properly, the Call Processor 702 sends an ACK/NACK/ERROR message with the ACK/NACK/ERROR field set to 0xFF within 3 seconds. After three repetitions, the GPS Module 704 stops sending the message. If segments of the same message are received out of order, the Call Processor 702 throws away the segments already received, ignores the remaining segments and sends an ACK/NACK/ERROR message with the ACK/NACK/ERROR field set to 0xFF within 3 seconds.

The system may also include special procedures such as updating the almanac in Flash from the Network. This example procedure is followed when the Call Processor 702 has received valid almanac from the network and wants to update the almanac in GPS Module 704's flash: 1) the Call Processor 702 sends a "PI2 request message" with ALM_REQ_FLAG set to "0", and ALM_DATA_FLAG set to "1" and valid almanac information in the Almanac section; 2) GPS Module 704 stores the almanac data in the RAM as soon as it gets the PI2 request message; and 3) when the Call Processor 702 closes the PI2 session from the F interface 736, GPS Module 704 transfers almanac information from RAM to FLASH.

If the transfer of almanac from RAM to FLASH has been successful, the SESSION_CLOSE_STATUS in "Session Closing Notification message" Close session in F interface 736 will be set to "Session Closed". If the transfer of almanac from RAM to FLASH has failed, the SESSION_CLOSE_STATUS in "Session Closing Notification message" Close session in F interface will be set to "Session Closing Failed."

The system may also include special procedures such as updating the almanac in Almanac from a satellite ("SV"). The following procedure will be followed when the Call Processor 702 wants to force the GPS Module 704 to collect new almanac and update the almanac in GPS Module 704's flash with collected almanac information:

1) Call Processor 702 sends a PI2 request message with ALM_REQ_FLAG set to "2" (Request Almanac Collection from SV), and ALM_DATA_FLAG set to "0" and no Almanac section;
2) Upon reception, GPS Module 704 attempts to collect almanac data from broadcast;
3) To check on the progress, Call Processor 702 periodically sends a PI2 request message with ALM_REQ_FLAG set to "3" (Report Almanac Update Status). Upon reception of the update status request message, GPS Module 704 shall immediately send a PI2 response message with: ALM_DATA_STATUS set to "1" if SLC is searching for satellites and not collecting any NAV message; ALM_DATA_STATUS set to "2" if GPS Module 704 tracks at least one satellite strong enough to collect data and is actually collecting data; ALM_DATA_STATUS set to "3" if GPS Module 704 has gone through a full search sequence and has not found any satellite suitable for data collection; and ALM_DATA_STATUS set to "4" if GPS Module 704 has collected a full almanac and ALM_WEEK_NUMBER and TOA either from RAM-stored or FLASH-stored almanac.
4) When the Call Processor 702 closes the PI2 session from the F interface 736, GPS Module 704 transfers almanac information from RAM to FLASH. If the transfer of almanac from RAM to FLASH has been successful, the SESSION_CLOSE_STATUS in "Session Closing Notification message" Close session in F interface 736 will be set to "Session Closed." If the transfer of almanac from RAM to FLASH has failed, the SESSION_CLOSE_STATUS in "Session Closing Notification message" Close session in F interface will be set to "Session Closing Failed". If no full almanac was collected during the session (and the ALM_DATA_STATUS was never found to be "4" during step 3), the GPS Module 704 will not try to transfer the incomplete almanac from RAM to FLASH. The SESSION_CLOSE_STATUS in the "Session Notification message" will be set to "Session Closed". A full almanac collection cycle will generally take less than 13 minutes. The Call Processor 702 should not expect to receive an ALM_DATA_STATUS set to "4" before such time has elapsed since the first time ALM_DATA_STATUS has been found set to "2".

When a PI2 session is open, the Call Processor 702 can check at anytime what the age of the almanac currently in flash. The Call Processor 702 sends a PI2 request message with ALM_REQ_FLAG set to "1", and ALM_DATA_FLAG set to "0" and with no Almanac section. Upon reception of the age of almanac request message, GPS Module 704 shall immediately send a PI2 response message with ALM_DATA_STATUS set to "0" and ALM_WEEK_NUMBER and TOA from FLASH-stored almanac. If Call Processor 702 sends a PI2 request message with both POS_REQ_FLAG and ALM_REQ_FLAG set to "1", the response will be undefined.

Figure 8:
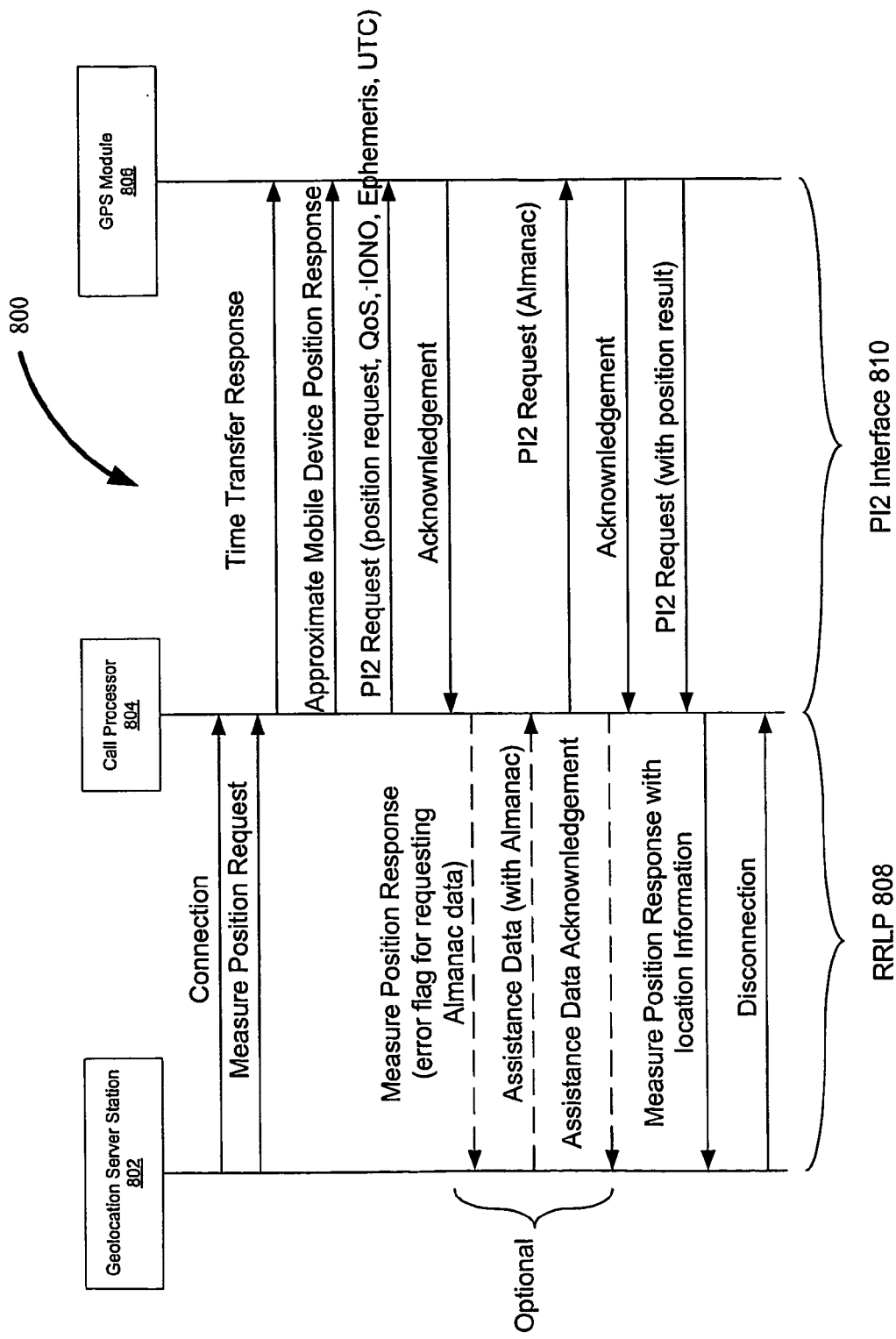
FIG. 8 shows an example of a RRLP to protocol independent interface message flow diagram between a Geolocation Server Station, Call Processor and GPS Module.

FIG. 8 shows an example of a RRLP to PI2 message flow diagram 800 between a Geolocation Server Station 802, Call Processor 804 and GPS Module 806. FIG. 8 graphically shows the process described earlier.

Figure 9:
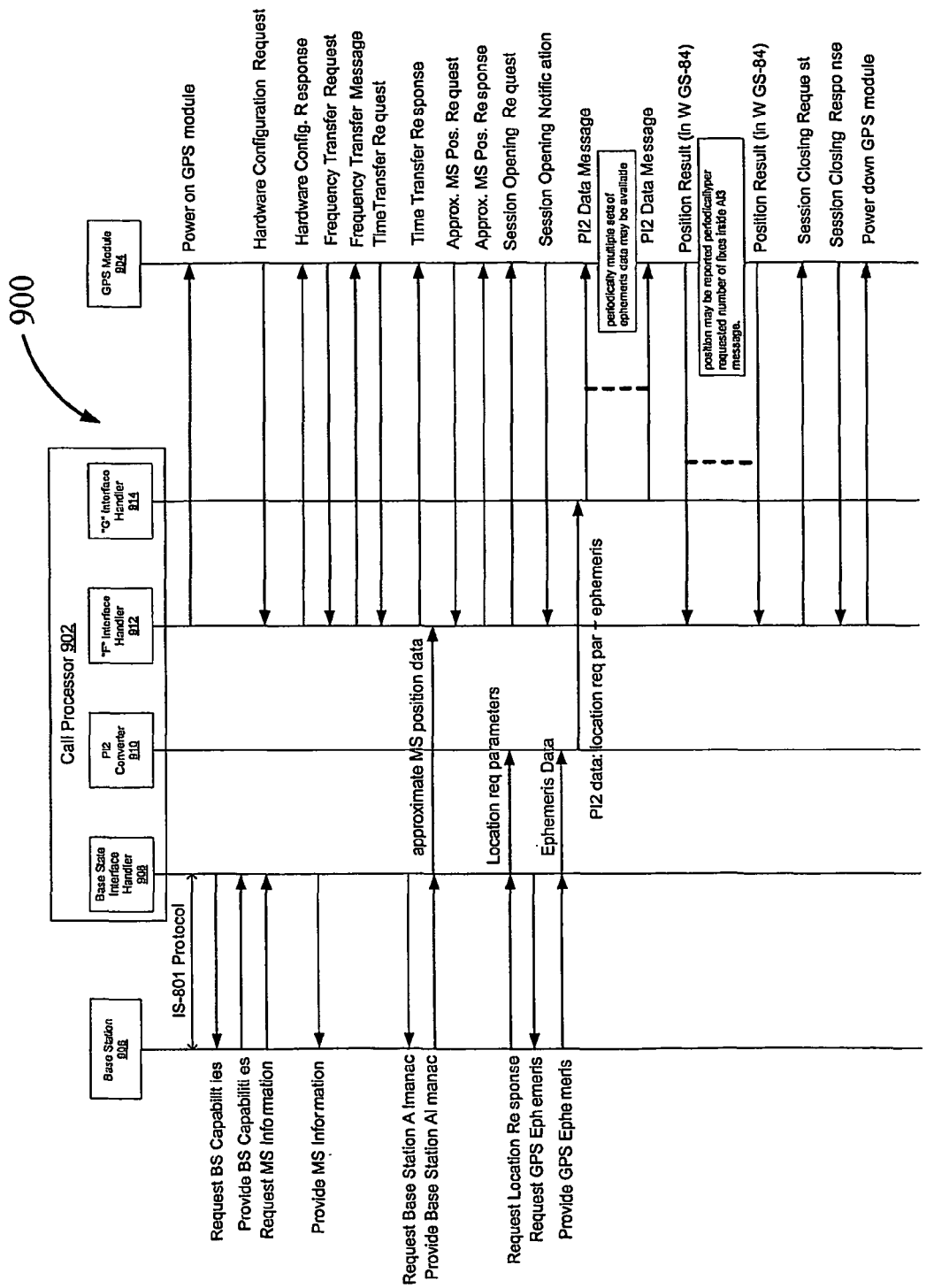
FIG. 9 shows an example of protocol independent interface message flow diagram between a call processor, GPS Module and a base station ("BS").

FIG. 9 shows an example of PI2 message flow diagram 900 between a call processor 902, GPS Module 904 and a base station ("BS") 906. The call processor 902 includes a base station interface handler 908, PI2 converter 910, F interface handler 912 and G interface handler 914. FIG. 9 shows graphically shows the process described earlier.

While various embodiments of the invention have been described, it will be apparent to those of ordinary skill in the art that many more embodiments and implementations are possible that are within the scope of this invention.

What is claimed is:

1. A method for processing, within a Mobile device, protocol aiding data received at a call processor with a Global Positioning System ("GPS") interface, where the protocol aiding data is produced according to a Geolocation Server Station protocol, the method comprising:
   receiving, at the GPS interface, the protocol aiding data received at the call processor;
   converting the received protocol aiding data to interface data that is transparent to the Geolocation Server Station protocol; and
   passing the transparent interface data to a GPS module.

2. The method of claim 1, further including packing the transparent interface data into a message format before passing the transparent interface data to the GPS module.

3. The method of claim 1, wherein the call processor receives the protocol aiding data from a base station.

4. The method of claim 3, wherein a Geolocation Server Station produces the protocol aiding data.

5. The method of claim 4, wherein the Geolocation Server Station utilizes a Code Division Multiple Access ("CDMA") protocol to produce the protocol aiding data.

6. The method of claim 5, wherein the protocol is IS-801.

7. The method of claim 5, wherein the protocol is Universal Mobile Telecommunication System ("UMTS").

8. The method of claim 5, wherein the protocol is CDMA 2000.

9. The method of claim 4, wherein the Geolocation Server Station utilizes a Global System for Mobile Communication ("GSM") protocol to produce the protocol aiding data.

10. The method of claim 4, wherein the Geolocation Server Station utilizes a General Packet Radio Service ("GPRS") protocol to produce the protocol aiding data.

11. The method of claim 4, wherein the Geolocation Server Station utilizes a Time Division Multiple Access ("TDMA") protocol to produce the protocol aiding data.

12. The method of claim 4, wherein the Geolocation Server Station utilizes a BlueTooth® protocol to produce the protocol aiding data.

13. The method of claim 4, wherein the Geolocation Server Station utilizes an IEEE 802.11 protocol to produce the protocol aiding data.

14. The method of claim 1, further including utilizing the protocol aiding data for GPS acquisition.

15. The method of claim 1, further including utilizing the protocol aiding data for calculating the location of the mobile device.

16. The method of claim 1, further including utilizing the protocol aiding data for improving the sensitivity of the GPS module.

17. The method of claim 1, wherein passing the transparent interface data to a GPS module includes passing the transparent interface data via a RS232 link.

18. A method for processing, within a mobile device, protocol aiding data received at a call processor with a Global Positioning System ("GPS") interface, where the protocol aiding data is produced according to a Geolocation Server Station protocol, the method comprising:

receiving, at the GPS interface, the protocol aiding data received at the call processor;

passing the interface data to a GPS module; and converting the received protocol aiding data to interface data that is transparent to the Geolocation Server Station protocol.

* * * * *

UNITED STATES PATENT AND TRADEMARK OFFICE
CERTIFICATE OF CORRECTION

PATENT NO. : 8,301,375 B2  
APPLICATION NO. : 10/523669  
DATED : October 30, 2012  
INVENTOR(S) : Chiayee et al.

Page 1 of 1

It is certified that error appears in the above-identified patent and that said Letters Patent is hereby corrected as shown below:

Column 13, line 66 ""T"" should be --"F"--.

Column 14, line 32, "P" should be --F--.

Signed and Sealed this  
Twenty-sixth Day of March, 2013

Teresa Stanek Rea  
*Acting Director of the United States Patent and Trademark Office*